(12) United States Patent
Donnerdal

(10) Patent No.: US 6,591,826 B1
(45) Date of Patent: Jul. 15, 2003

(54) DEVICE ON A PORTABLE CUTTING OR SAWING MACHINE

(75) Inventor: Ove Donnerdal, Sävedalen (SE)

(73) Assignee: Aktiebolaget Electrolux (publ), Stockholm (SE)

( * ) Notice: Subject to any disclaimer, the term of this patent is extended or adjusted under 35 U.S.C. 154(b) by 0 days.

(21) Appl. No.: 09/587,972

(22) Filed: Jun. 6, 2000

(51) Int. Cl.$^7$ .................................................. B28D 1/04
(52) U.S. Cl. ...................... 125/13.01; 451/344; 125/12; 125/14; 30/370; 264/154; 264/162
(58) Field of Search ................................ 125/12, 13.01, 125/14, 15; 451/344, 358, 353, 350, 357; 30/370, 374, 375, 377, 388; 264/154, 162

(56) References Cited

U.S. PATENT DOCUMENTS

| | | | | |
|---|---|---|---|---|
| 4,840,431 A | * | 6/1989 | Jedick ........................ | 125/14 X |
| 5,381,780 A | * | 1/1995 | Yelton et al. .................. | 125/14 |
| 5,435,294 A | * | 7/1995 | Williamson ................... | 125/12 |
| 5,575,271 A | * | 11/1996 | Chiuminatta et al. ...... | 125/12 X |
| 5,595,170 A | * | 1/1997 | Lupi ............................. | 125/12 |
| 5,743,247 A | * | 4/1998 | Kingsley et al. ............... | 125/12 |
| 6,102,022 A | * | 8/2000 | Schave ...................... | 125/12 X |

* cited by examiner

Primary Examiner—Joseph J. Hail, III
Assistant Examiner—Anthony Ojini

(74) Attorney, Agent, or Firm—Michael D. Bednarek; Shaw Pittman LLP

(57) ABSTRACT

The invention relates to a device on a handheld cutting or sawing machine with a rotatable cutting or sawing blade; a driving machinery for rotating the blade; means for supplying cooling or flushing water on the blade and/or a workpiece; a rear handle with controls for the driving machinery; a front handle bow with a front part (5) which is the normal gripping part of the handle bow; a right hand side part (6) and a left hand side part; and a water valve (8) for control of the flow of cooling or flushing water, said valve comprising a valve housing (27) with a valve house chamber (33); a valve body (36) which is turnable about an axis of rotation (23) by means of a lever (22); an inlet nipple (15) for the connection of a water hose (16) for incoming water to the valve; and an outlet nipple (17) for the connection of a water hose (10) for outgoing water from the valve; and securing means (35, 43) for mounting the water valve on the handle blow. The characteristic features are that the water valve is mounted on the right hand side part (6) of the handle bow, a side (21) of the valve facing the operator, when the operator in a normal operating position is gripping the front gripping part (5) of the handle bow with his left hand; that the lever (22) is provided on said side facing the operator; and that the valve is mounted so close to said gripping part (5) that the operator can reach and manipulate the lever with any of the fingers of his left hand at the same time as he has a grip on the front gripping part of the handle bow.

11 Claims, 7 Drawing Sheets

DEVICE ON A PORTABLE CUTTING OR SAWING MACHINE

TECHNICAL FIELD

The invention relates to a device on a handheld cutting or sawing machine with a rotatable cutting or sawing blade; a driving machinery for rotating the blade; means for supplying cooling or flushing water on the blade and/or a workpiece; a rear handle with controls for the driving machinery; a front handle bow with a front part which is the normal gripping part of the handle bow; a right hand side part and a left hand side part; and a water valve for control of the flow of cooling or flushing water, said valve comprising a valve housing with a valve house chamber; a valve body which is turnable about an axis of rotation by means of a lever; an inlet nipple for the connection of a water hose for incoming water to the valve; and an outlet nipple for the connection of a water hose for outgoing water from the valve; and securing means for mounting the water valve on the handle blow.

BACKGROUND OF THE INVENTION

Various embodiments of devices of the above mentioned type are known in the art. Typically, the valves which are included in the device are standard type valves and have comparatively small outer dimensions and are placed so that the operator shall not unintentionally touch the valve during operation. This principle, however, has caused a number of inconveniences. Some of them shall be mentioned here. Because the valve is placed so that it is difficult to find, the operator must keep his left hand about the gripping part of the handle bow and manipulate the valve with his right hand, which means that he has to leave his hold of the rear handle and hence also leave his access of the controls for the driving machinery. This in other words means that he cannot control the flow of water at the same time as he operates the machine. This is a serious drawback because the type of work often makes it desirable to be able to vary the flow of water during operation, e.g. to increase the flow of water as the cutter blade successively cuts deeper and deeper in a workpiece and the kerf is being filled with cuttings. The more or less hidden location of the valve also makes it impossible for the operator to read the setting of the valve during work. Another inconvenience with today's devices, where the inlet and the outlet of the valve have the same direction, is that they, although the water valve is placed so that it is difficult to access, do not make it possible to guide the hose from the valve to the exit nozzle in such a way that problems can be avoided. To the contrary, such problems are frequent in connection with existing machines and cause inconveniences during operation of the machine. For example, the hose may hinder the operator in his work as he shall grip about the gripping part of the handle bow, and this is particularly true when he uses thick mittens, which he does as a rule. In connection with some machine designs, the hose also can be damaged through contact with the exhaust muffler of the machine, when the muffler is located between the engine and the cutter blade, and the cutter blade is provided with a guard, which can be moved backwards towards the hose. Other problems and inconveniences are related to the design and mounting of the valve.

BRIEF DISCLOSURE OF THE INVENTION

The purpose of the invention is to address the above mentioned complex of problems. More particularly, the invention aims at providing one or more of the following advantages or improvements:

To make it possible for the operator to reach the turning device of the water valve with any of the fingers of his left hand without leaving his hold of the gripping part of the handle bow and thus be able to adjust the flow of water accurately during operation. This implies for instance that the operator can increase the flow of water in order to flush the kerf clean, if the kerf tends to be filled with cuttings and vice versa to reduce the flow when the kerf has been rinsed, or to reduce the flow in order e.g. to avoid violent splashes from the blade, especially when the blade not yet has reached any greater cutting depth.

To be able during operation to read the turning device's setting, which represents a certain flow of water for every pressure of incoming water to the valve.

To provide a device which makes it easy guide run the water hose from the valve, independent of the entrance direction to the valve, in such a way that the hose does not make any serious hinder for the operators work and/or so that the hose will not be damaged during any movements of the operation of the machine.

To design the valve so that it does not restrict the operator's normal use of the handles.

To provide a valve which is easy to set and to adjust to different pressures of incoming water, and which preferably displays a large and clear angle difference between different settings, which represent different flows of water.

To provide a water valve which is robust and impact resistant.

To provide a valve having an outward appearance which is substantially void of sharp edges and projecting parts, which could hurt the operator, and/or in which his clothings could get caught, and/or which could cause other damages.

To provide a water valve which can be employed as a standard element for many types of cutting or sawing machines of the above mentioned kind.

To provide a valve which is easy to mount.

To provide a valve which is cheap to manufacture.

One or more of the above advantages or improvements can be achieved therein that the invention is characterised by what is stated in the characterising part of claim 1. Other advantages and improvements can be achieved therein that the invention is characterised by that is stated in the subsequent patent claims. Other features and aspects of and advantages or improvements which can be achieved through the invention will be apparent from the following description of a preferred embodiment.

BRIEF DESCRIPTION OF DRAWINGS

In the following description of a preferred embodiment, reference will be made to the accompanying drawings, in which.

DESCRIPTION OF A PREFERRED EMBODIMENT

Figure 1:
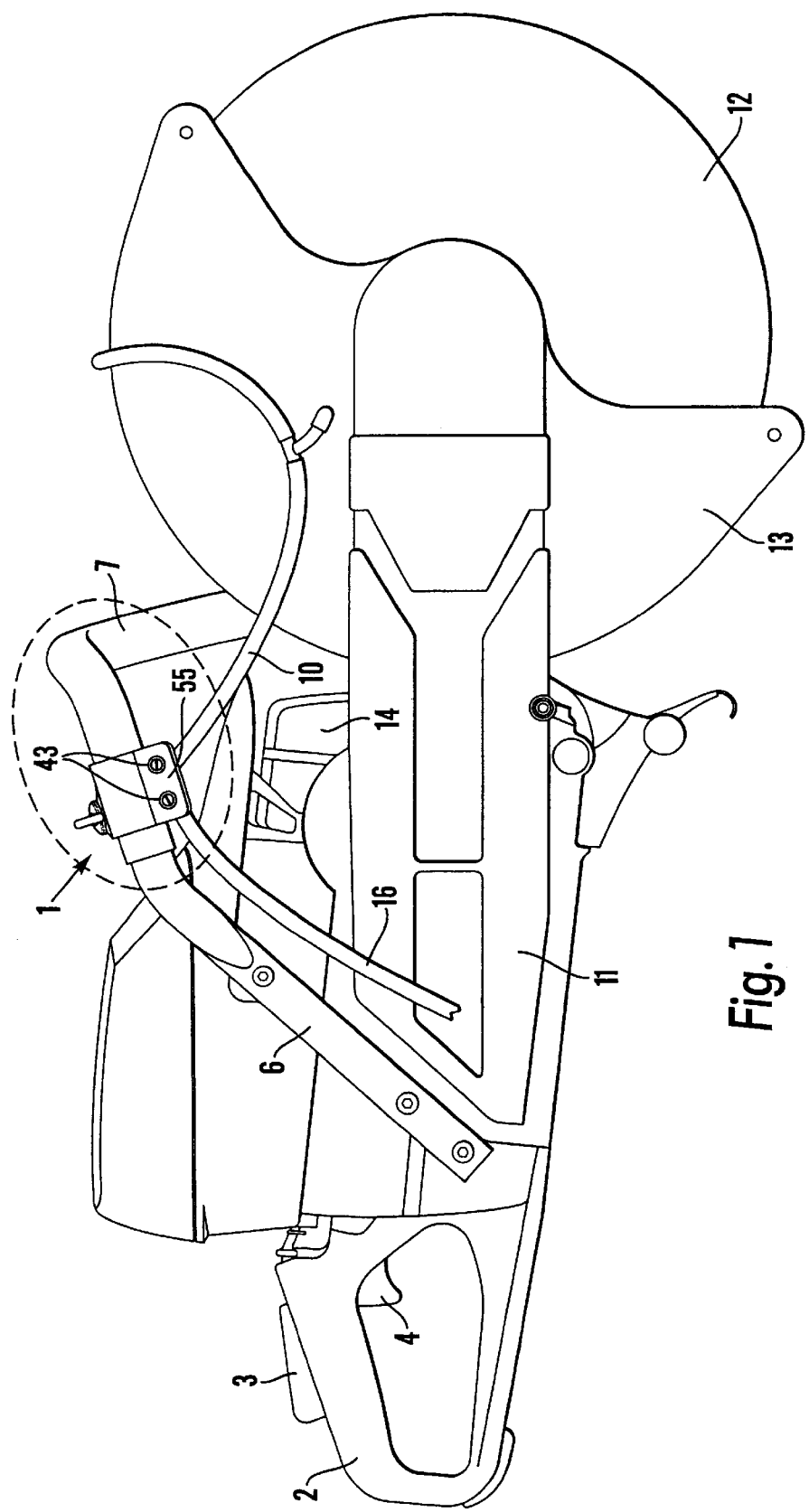
FIG. 1 is a side elevation of a cutting machine provided with a device according to the invention.
Figure 2:
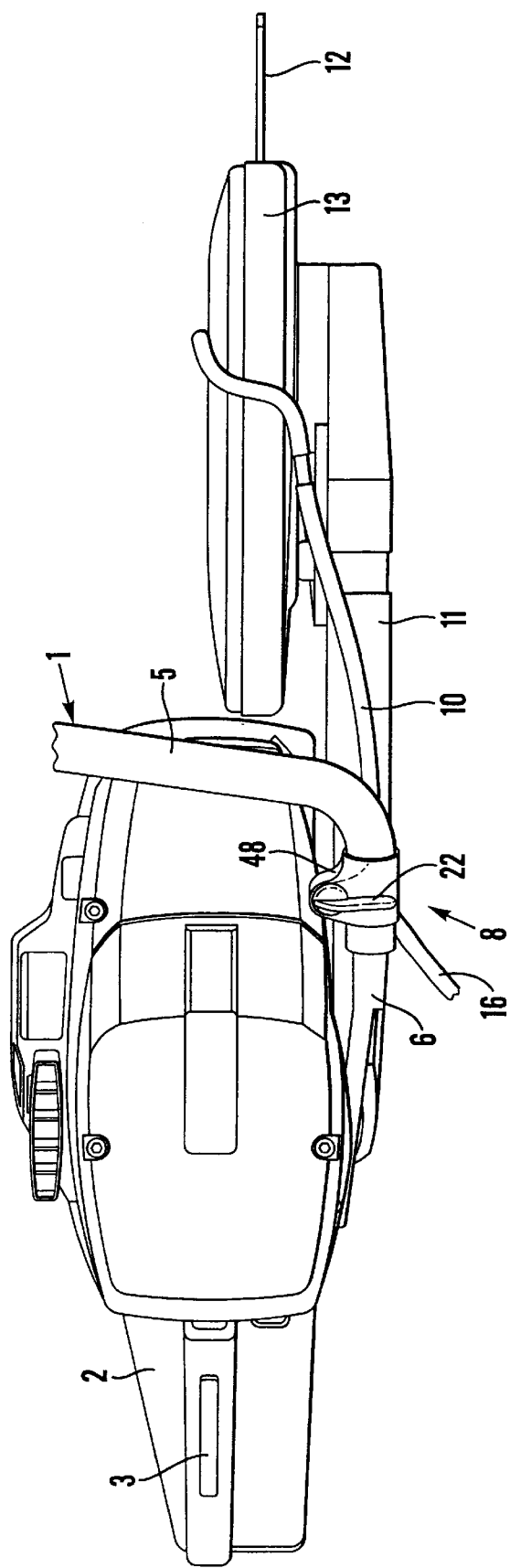
FIG. 2 shows the same machine from above.
Figure 3:
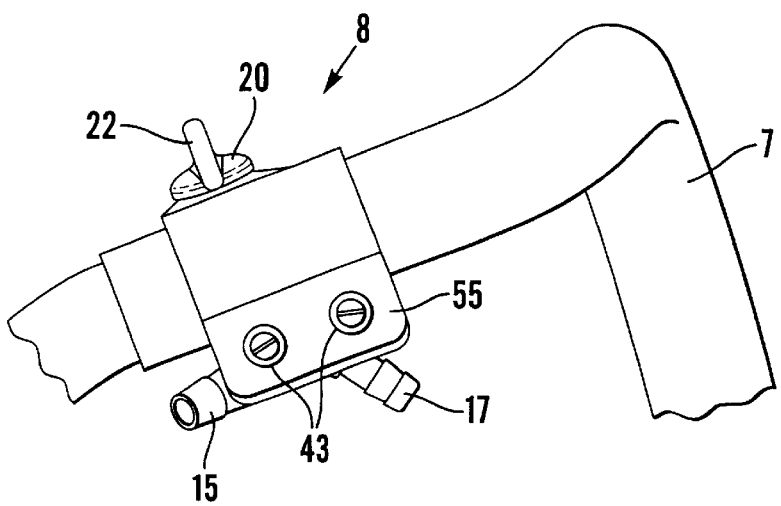
FIG. 3 shows the device of the invention from the right at a larger scale, corresponding to the encircled region in FIG. 1.
Figure 4:
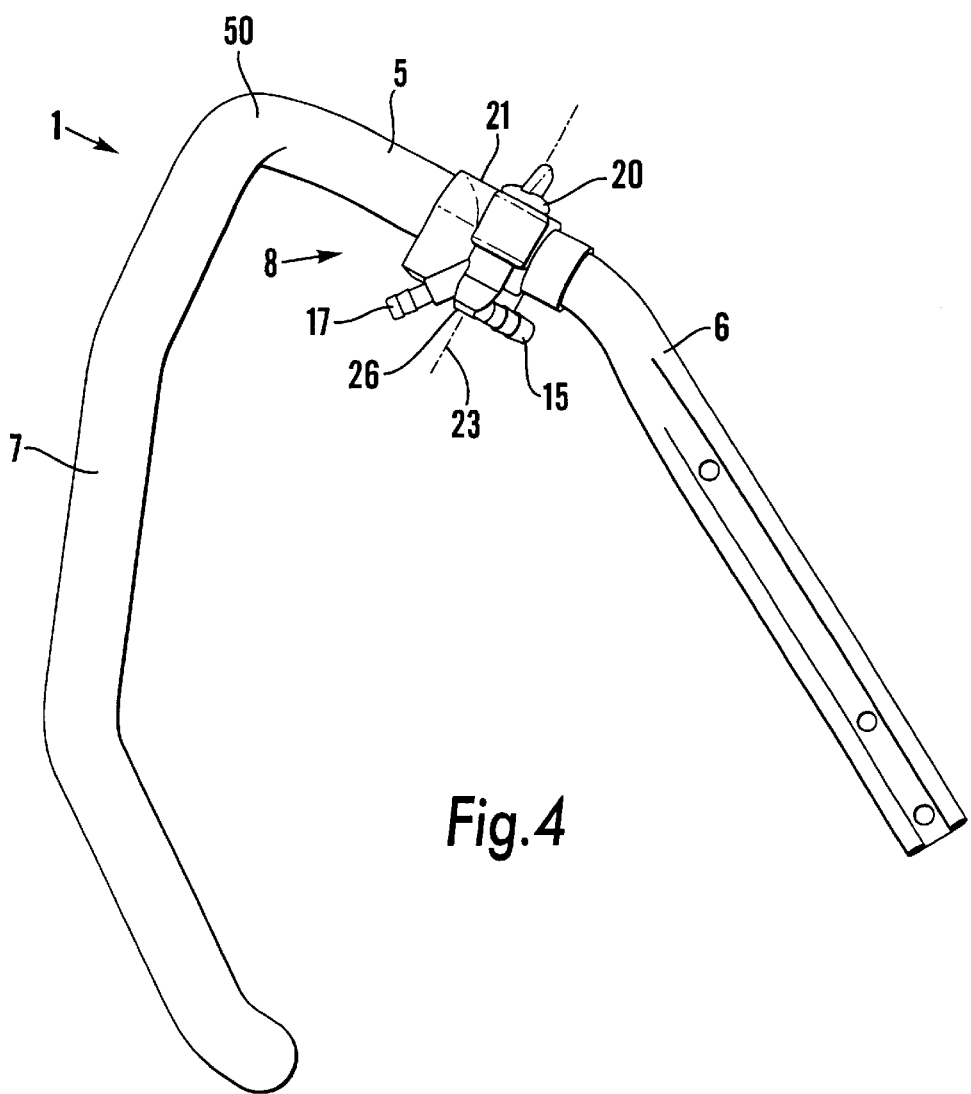
FIG. 4 shows the handle bow with the mounted device as seen from the left.
Figure 5:
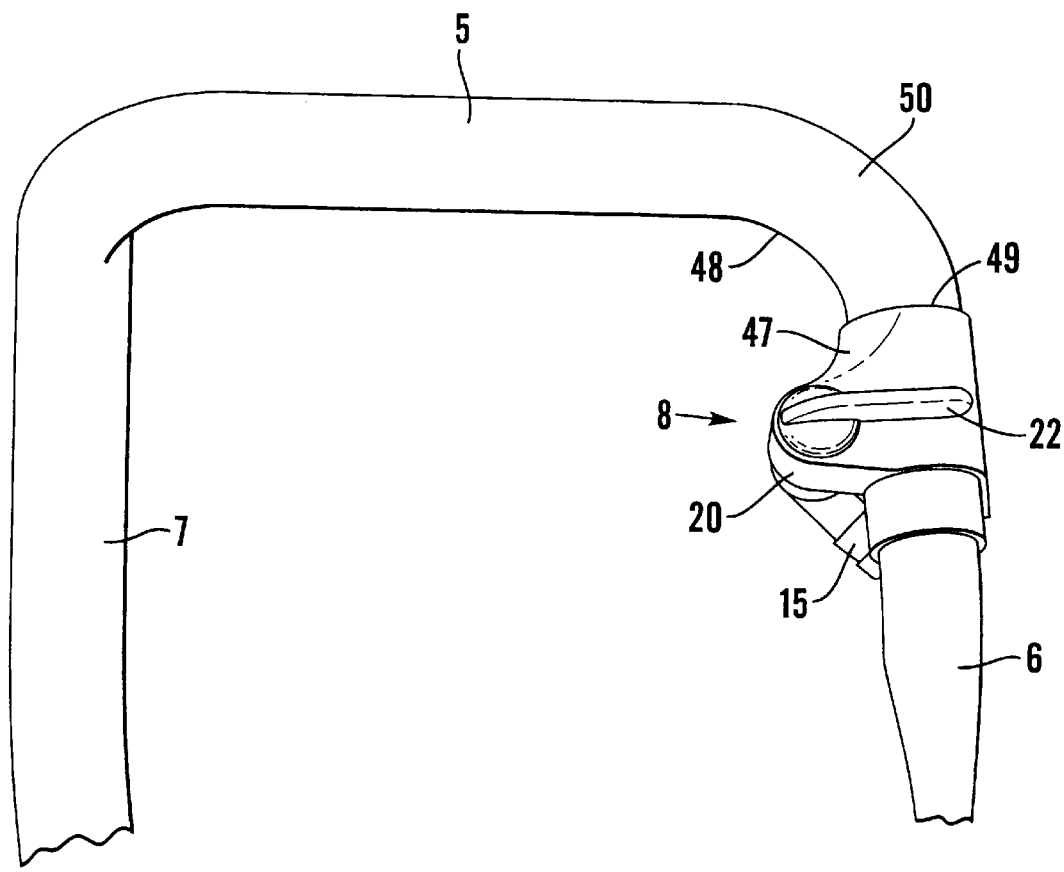
FIG. 5 shows a portion of the handle bow, comprising the gripping part and the device according to the invention as viewed obliquely from above and from the rear, as they are normally viewed by the operator.
Figure 6:
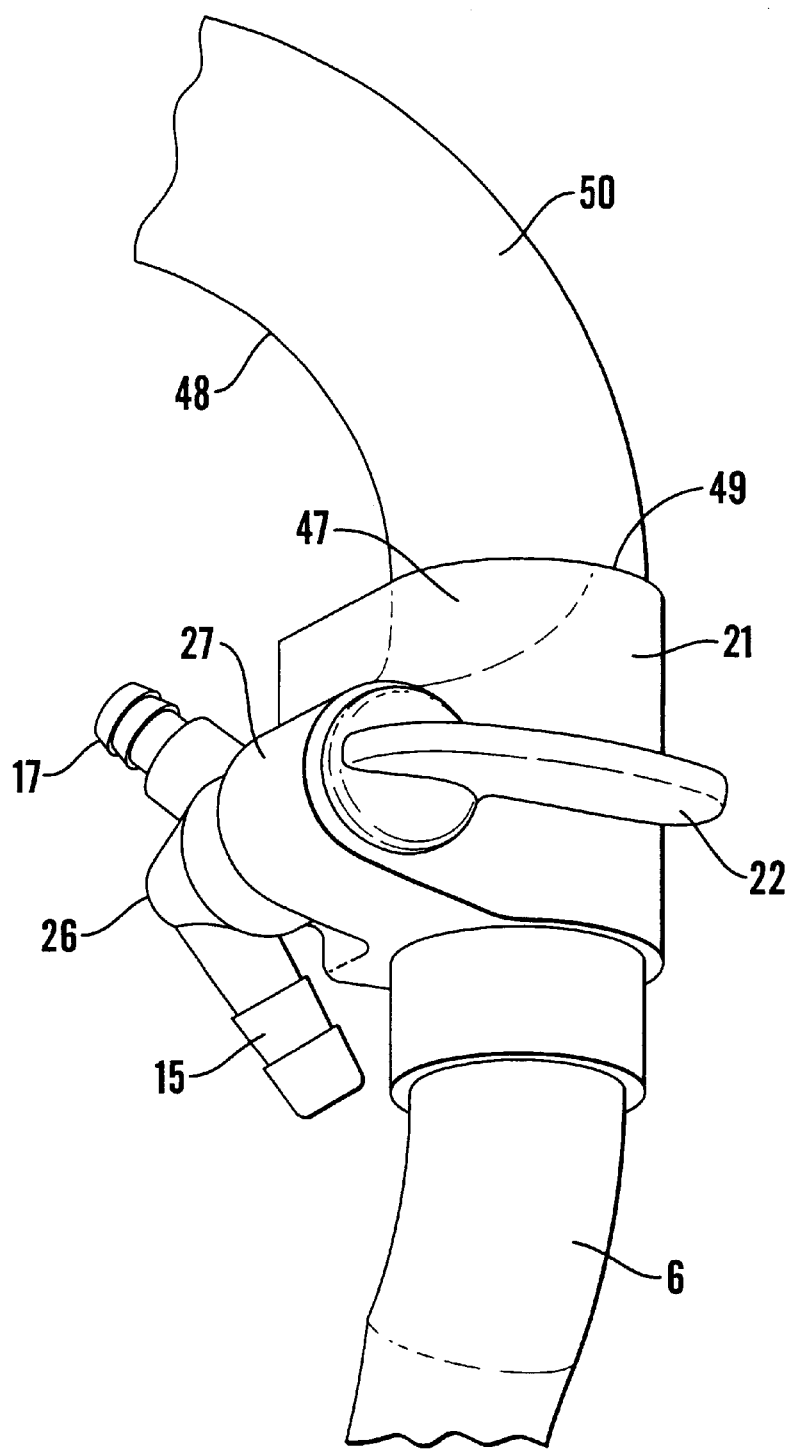
FIG. 6 is a perspective view of the device at a larger scale, as viewed a little more from the left than in FIG. 5.

FIGS. 1 and 2 show a combustion engine powered cutting machine with a handle bow 1 and a rear handle 2. In connection to the rear handle there are controls 3, 4 for manoeuvering the driving machinery of the cutting machine by means of the fingers of the right hand of the operator at the same time as the operator is gripping about the rear handle 2. A front part 5 of the handle bow 1 is the normal gripping part of the handle bow, about which the operator keeps his left hand during operation. The gripping part 5 is conventionally horizontal. From the gripping part 5 a right hand side part 6 of the handle bow extends obliquely downwards and is fastened to the right hand side of the machine. A left hand side part 7 extends from the gripping part 5 and is fastened at the bottom of the machine under a blade holder 11. A cutting blade or cutting wheel is designated 12 and a muffler is designated 14.

A water valve 8 of the invention is mounted on the right hand side part 6 of the handle bow, at a short distance behind the gripping part 5. With reference now also to FIGS. 3 to 6, the valve 8 is provided with an inlet nipple 15 and with a water hose 16 connected to said inlet nipple, FIGS. 1 and 2, for incoming water to the valve, and with an outlet nipple 17 with an outgoing water hose 10 connected to said outlet nipple, said outgoing water hose leading to not shown nozzles on a guard 13 for the cutting blade 12.

According to the invention, the water valve 8 exhibits a side 21, which faces the operator as the operator is operating the machine and is holding his left hand about the gripping part 5. A lever 22 is provided on said side 21, which faces the operator, and which is the upper side of the valve over the right hand side part 6 of the handle bow and is flat within an area having a substantial extension.

A valve spindle unit 20, and hence a valve body included in the valve, is turnable by means of the lever 22 about an axis of rotation 23, which according to the preferred embodiment extends on one side of the right hand portion 6 of the handle bow, more exactly on the left hand side of the right hand portion 6 of the handle bow in order to make the lever 22 as easily accessible as possible. The lever 22, which forms the top of the spindle unit is elongated. More particularly, the lever 22, in the position shown in FIGS. 3 to 6 extends over the entire side 21 of the valve 8 which faces the operator. The lever 22 thus, as is apparent from the drawings, has a length which is equal to the width of the side 21, which implies that the length of the lever 22 is substantially larger than the thickness of handle bow in the region of the valve 8, all for the purpose to make it easy for the operator to access and to manipulate the lever 22 and hence to manipulate the salve, including to adjust the flow of water accurately, and in order easily to be able to read the setting of the lever 22, also during operation by taking a quick glance at the valve.

The inlet nipple 15 extends from a region under the right hand side part 6 of the handle bow behind the valve 8 obliquely forwards towards a bottom portion 26 of the valve in a plane which is parallel with the inclination of the right hand side part 6 of the handle bow in the region of the valve. The incoming water hose 16 extends in a conventional way along the right hand side of the machine.

The outlet nipple 17 extends from the lower part of a valve housing 27 obliquely forwards/downwards. Through this inclination of the outlet nipple 17 the outgoing water hose 10 is directed away from the gripping part 5 of the handle bow and also away from the muffler 14.

The design and features of the valve shall now be explained more in detail also with reference to FIG. 7 to 10.

The valve 8 consists of only two parts; a valve housing unit 30 and said valve spindle unit 20. The valve housing unit 30 includes said valve housing 27, which has an interior threading 32, a valve housing chamber 33 and said bottom part 26; the inlet nipple and the outlet nipple 15 and 17, respectively; and a clamp 35 for mounting of the valve on the right hand side part 6 of the handle bow.

Figure 10:
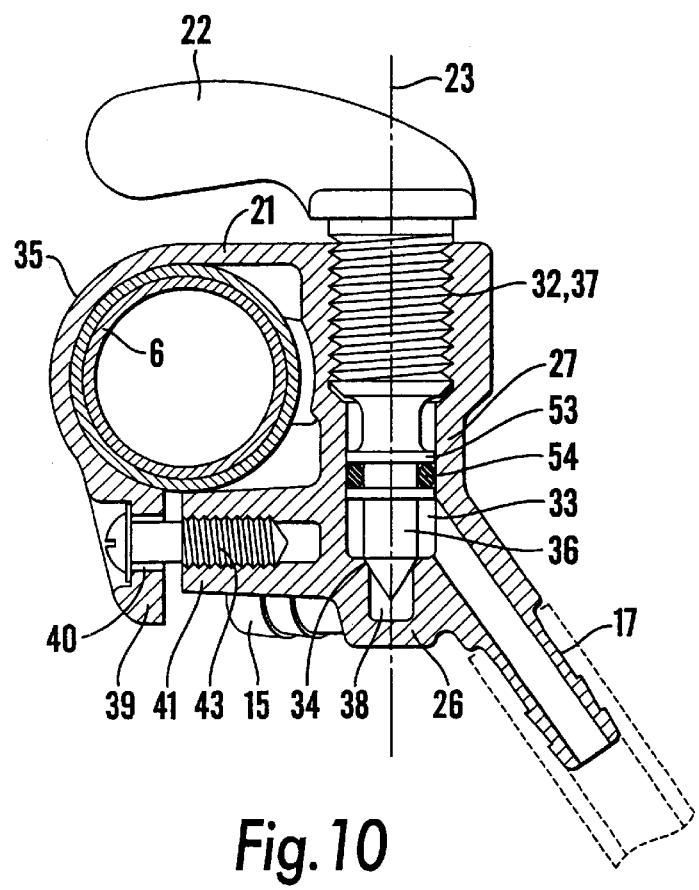
FIG. 10 shows the mounted valve in a cross section in a first plane at right angle to the right hand part of the handle bow, coinciding with the axis of rotation of the valve spindle, and in the same picture also the outlet nipple in a longitudinal cross section in a second plane which is angled forwards relative to the first plane.

The valve spindle unit 20 has, with reference to FIG. 10, a turning spindle with a pointed valve body 36, a threaded portion 37 cooperating with the threading 32 in the valve housing part and the elongated turning handle (the lever) 22.

The cylindrical cavity, included the threaded portion, which is provided to receive the valve spindle, extends from the flat upper side 21 at a level above the handle bow part 6 down on the left hand side of and at a distance from the right hand side part 6 of the handle bow all the way down to the bottom part 26, in which there is a small inlet chamber 38 at a level at a distance below the under-side of the right hand side part 6 of the handle bow.

The valve is of a seat valve type, more exactly of a type of needle valve. The point of the valve body 36 is thus provided to be able to be entered into the inlet chamber 38 and be pressed against an annular valve seat 34 in the transition between the inlet chamber 38 and the valve housing chamber 33. The point can be conical, as is shown in FIG. 10, but it can also have any other shape for the provision of a desired flow characteristic, e g a convex shape which allows an increased turning angle and a good adjustability at small flows or high pressures. The inlet nipple 15 mouths in the inlet chamber 38, and the outlet nipple extends from the valve housing chamber 33, from an outlet port immediately above the valve seat 34. FIG. 10 shows the valve, when it is completely closed. By turning the valve spindle with the valve body 36 about the axis of rotation 23, counter-clockwise with reference to FIG. 5, the valve body 36 is distanced from the valve seat 34, so that a passage is created between the inlet chamber 38 and the valve housing chamber 33, and consequently a passage between the inlet nipple 15 and the outlet nipple 17. The threads 32, 37 have a large pitch, so that also a comparatively small turning of the lever 22 provides a significant change of the opening area. This function shall be commented more in detail in connection with the description of the functioning of the invention. On the valve body 36 there are also a pair of flanges 53, which contact the valve housing chamber wall and function as guides and hold a sealing O-ring 54.

Figure 9:
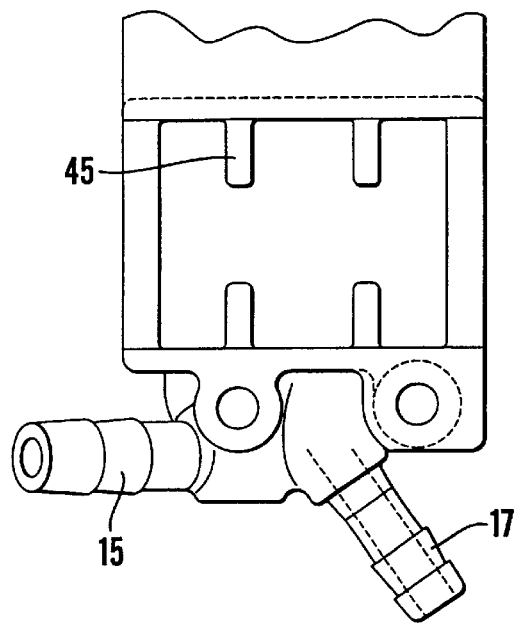
FIG. 9 is a view along the line IX—IX in FIG. 7.

The valve housing unit 30 as well as the valve spindle unit 20 are made of a very tough, impact resistant polymer, which is possible because of the chosen design of the valve. This makes it possible to integrate a clamp with the valve housing unit 30. If the valve housing would be exposed to such a severe mechanical damage that it is bent, also the valve spindle will be bent, because of the nature of the plastic material, wherein the valve function is maintained essentially unimpaired. In order to restrict the bending in case of hard tightening, supporting walls 45, FIG. 9, are provided, but not all the way.

Figure 8:
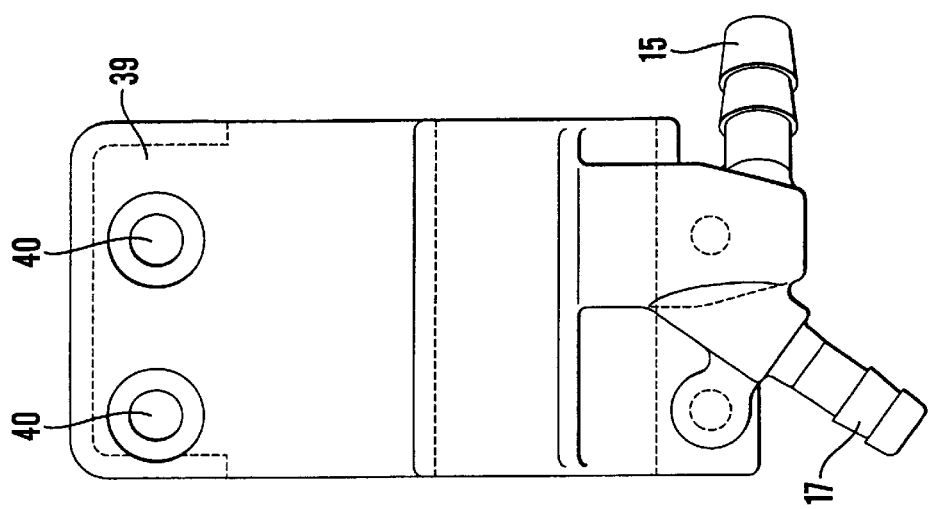
FIG. 8 is a view along the line VIII—VIII in FIG. 7.
Figure 7:
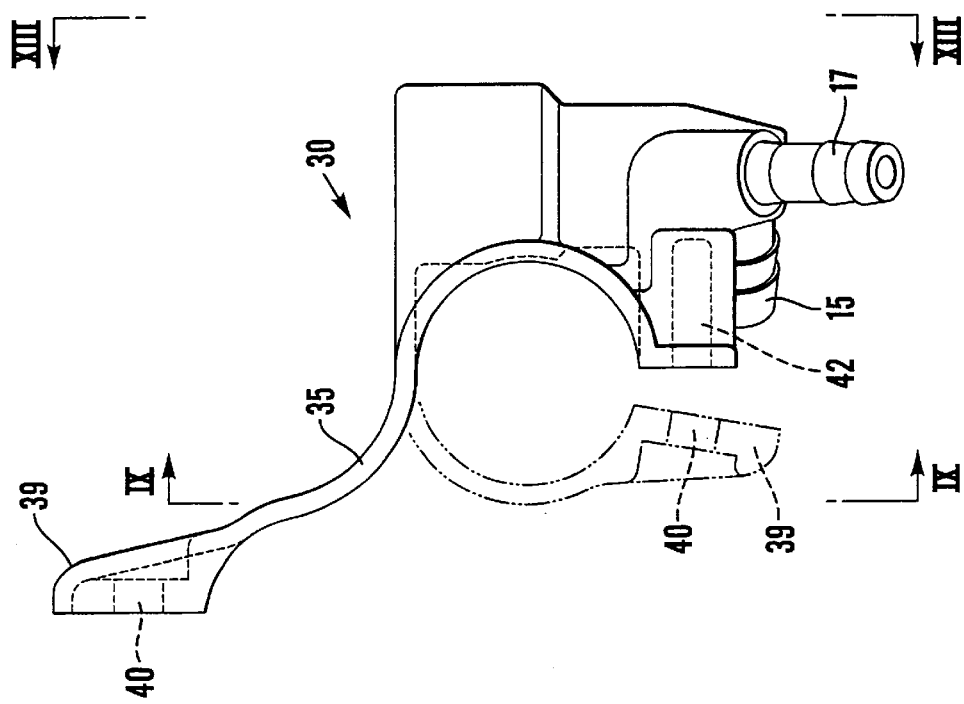
FIG. 7 shows the valve before an integrated securing member has been folded for mounting.

FIGS. 7 and 8 show the unit 30, before the valve has been mounted and the clamp 35 has been folded around the handle bow part 6, as is shown in FIG. 10. The outside surface of the clamp 35 forms an extension of the flat upper side 21 of the valve housing unit 30 and is terminated by a shank portion 39 provided with two through-holes 40. On the valve housing unit 30 there is a fastening block 41, which extends laterally and in which there are provided a pair of screw holes 42 which match the holes 40 in the shank portion 39. The shank portion 39 is forced towards the fastening block 41 by means of self-tapping screws 43, so that the valve housing unit 30 and hence the entire valve is clamped to the part 6. In order to increase the clamping pressure the valve housing unit 30 is provided with said supporting walls 45 in the wall between the valve housing and the handle bow part 6. These supporting walls 45 are provided with points, grooves or edges, which increase the attachment against the gripping plastic material of the handle bow. The screw heads are recessed in a recess in the shank portion 39. This, in combination with the smooth or rounded shapes of the exterior of the valve 8 contribute to the provision of ergonomic benefits of the device. In this connection, also the smoothly round region 47, FIGS. 5 and 6, on the side of the valve device 8, which is turned obliquely forwards towards the gripping part 5 of the handle bow especially should be mentioned. Said region 47 forms a continuation of the inside 48 of the smoothly bent transition between the gripping part 5 of the handle bow and the right hand side 6 of the handle bow. The rounded shape of the region 47 makes it possible for the operator to work with the grip of the thumb without discomfort in the regions 47 and 48, and the smoothly rounded region 47 also facilitates quick changes in connection with the manipulation of the valve 8. The smoothly rounded region 47 thus allows the hand of the operator to come very close to the valve, without the valve restricting the ordinary gripping region or the comfort of the operator when using the front handle. Typically, the valve 8 is mounted, so that the front edge 49 of the valve will lie essentially in the border line between the bent transition portion 50 between on one hand the gripping part 5 and the right hand side part 6 of the handle bow, and on the other side said right hand side 6.

What is claimed is:

1. A device on a handheld cutting or sawing machine with a rotatable cutting or sawing blade, comprising: a machine body at the rear of the cutting or sawing blade; a driving machinery for rotating the blade; a rear handle with controls for the driving machinery; a front handle including a left hand side part, right hand side part and a front part, which is the normal gripping part of the front handle, said front part extending on a level over the machine body from the left hand side part of the front handle to the right hand side part of the front handle, and a bent transition portion between the front part and the right hand side part of the front handle; devices for supplying at least one of cooling and flushing water on the at least one of a blade and a work piece, and a water valve for control of the flow of the at least one of the cooling and flushing water, said valve comprising a valve housing with a valve house chamber; a valve body which is turnable about an axis of rotation by means of a lever; an inlet nipple for the connection of a water hose for incoming water to the valve; and an outlet nipple for the connection of a water hose for outgoing water from the valve; and securing means for mounting the water valve on the front handle, wherein the water valve is mounted on the right hand side part of the front handle adjacent to said bent transition portion between the front part of the front handle and said right hand side part, a side of the valve facing an operator of the handheld machine when the operator in a normal operating position is gripping the front gripping part of the front handle with his left hand, such that the operator can reach and manipulate the lever with any of the fingers of his left hand at the same time as he has a grip on the front gripping part of the front handle.

2. A device according to claim 1, wherein the axis of rotation of the valve extends on the left hand side of the right hand side part of the front handle.

3. A device according to claim 2, wherein the axis of rotation and the valve housing extend on the left hand side of the right hand side part of the front handle; wherein the exterior of the water valve having concavely rounded portion between the front edge of the valve and the valve housing; and wherein the concavely rounded portion forms a continuation of a bent transition portion between the front part and the right hand side part of the front handle.

4. A device according to claim 1, wherein the lever extends from the area of the axis of rotation at the side of the right hand side part of the front handle in a direction towards and at least a piece over the right hand side part of the front handle in at least one setting position of the lever.

5. A device according to claim 4, wherein the lever is elongated and has a length which is at least half as long as a width of the front handle in the region of the lever.

6. A device according to claim 1, wherein the lever is provided at a level which is higher than an upper side of the right hand side part of the front handle in the region of the valve; wherein a cavity for a valve spindle in the valve housing extends at least a piece along one side of the right hand side part of the front handle; wherein a bottom portion of the cavity is provided at a level which is lower than the underside of the right hand side part of the front handle; and wherein an inlet channel of the inlet nipple mouths in said bottom portion.

7. A device according to claim 6, wherein the inlet nipple extends from a region under the right hand side part of the front handle obliquely forwards towards the bottom portion of the valve, which houses the bottom portion of the cavity in the valve housing.

8. A device according to claim 6, wherein the valve is of a seat valve type having a seat between the valve housing chamber and the bottom portion and a valve body on a valve spindle unit, which is provided with threadings cooperating with threadings in the valve housing, said valve body being movable towards and from the valve seat through a screwing movement by means of the lever.

9. A device according to claim 1, wherein the outlet nipple extends from the valve housing in a direction obliquely forwards and downwards.

10. A device according to claim 1, wherein the valve housing and a clamp, which is provided for the mounting of the valve on the front handle, are made in one piece of a soft plastic material.

11. A device according to claim 10, wherein the outside of the clamp forms an extension of the side of the valve facing the operator.

\* \* \* \* \*